July 24, 1956     H. M. MUNCHERYAN     2,755,665

TEMPERATURE INDICATING DEVICE

Filed March 30, 1953

United States Patent Office 2,755,665
Patented July 24, 1956

2,755,665

TEMPERATURE INDICATING DEVICE

Hrand M. Muncheryan, Duarte, Calif.

Application March 30, 1953, Serial No. 345,346

9 Claims. (Cl. 73—343)

The present invention relates to temperature-indicating devices, and more particularly to an improved liquid temperature indicator in which various colored areas designate cold, warm and hot states of the liquid, such as milk, blood plasma preparatory to administering it to the patient, water and the like.

Heretofore, the temperature of a baby's milk, after having been warmed up in a bottle immersed in water heated in a pan, has been determined by inverting the bottle and shaking its contents to drip over a portion of one's inner surface of the forearm and sensing the degree of temperature. If the forearm feels a sensation of heat the milk is hot; if a sensation of cold, the milk is cold; and, if a neutral or slightly warm sensation is felt, the milk is said to be ready for serving. The use of a conventional type thermometer is impractical because of breakage, necessity of sterilizing it prior to immersing it into the milk, and the task is cumbersome. Other methods have consisted of placing the bottle of milk in a predetermined amount of water in a pan which is heated until the entire water is evaporated, whereupon the milk is presupposed to come up to the required temperature. None of these methods could be reliable because of the dependence of such schemes on a number of variable factors, such as the variation of heat and cold sensation of one person from the other, as in the case of the "forearm" method, and the variation of the initial milk temperature from one bottle to another prior to its being placed in a predetermined quantity of water to be heated to evaporation. Furthermore, in the latter case, the predetermined quantity of water is variable, because its amount cannot be controlled accurately and is further dependent on the duration of time during which the water quantity is made to evaporate. Obviously, such methods are haphazard, primitive in nature, and at times tend to endanger the health of the baby, such as when the milk is too hot or too cold.

A principal object of my invention is to provide a temperature-indicating device which can be easily mounted in a conventional type milk bottle, the milk heated in the bottle, and its temperature readily determined by a glance at the device mounted in the bottle.

Another object of my invention is to provide a temperature indicator which is rugged in construction, and withstands ranges of temperatures encountered in warming or sterilizing the milk. The milk can be sterilized, with the indicator mounted in the bottle, at any temperature desired without damaging any part of the indicator.

A further object of the invention is to provide a temperature indicator which will fit most conventional type milk bottles without the use of any accessory parts to hold or secure the indicator in the bottle in order to utilize its temperature-indicating properties.

A still further object of my invention is to provide a disk or tubular collar with a plurality of variously colored sections which are caused to move behind a clear window, in the indicator, by means of a thermostatic element or agent in accordance with the degree of temperature of the bottle of milk.

Other objects of the invention are to provide a temperature-indicating device of the aforementioned character which will be simple in construction, highly efficient and reliable in use, compact, and which may be manufactured at low cost.

Further objects and advantages of the invention will become apparent from the following specification taken in conjunction with the accompanying drawing wherein like characters of reference designate corresponding parts throughout the several views, and wherein.

Figure 1:
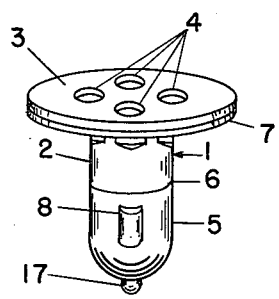
Figure 1 is a plan view of one embodiment of the invention.
Figure 2:
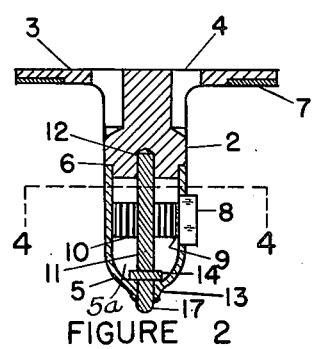
Figure 2 is a sectional detail view of the embodiment shown in Figure 1.
Figure 3:
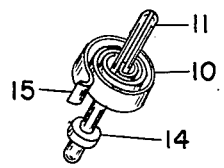
Figure 3 is the plan view of the thermostatic element with its central pin.
Figure 4:
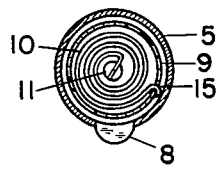
Figure 4 is a cross-sectional view of the device taken on line 4—4.
Figure 5:
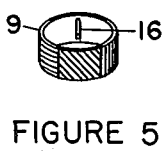
Figure 5 is the multiple-color temperature-indicating tubular collar.
Figure 8:
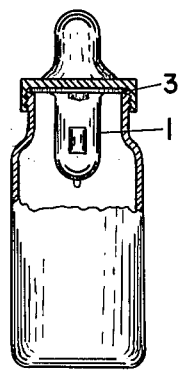
Figure 7:
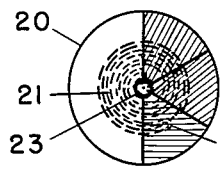
Figure 6:
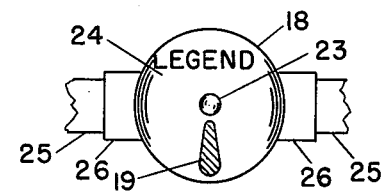
Figure 6 is the plan view of another embodiment of my invention.
Figure 9:
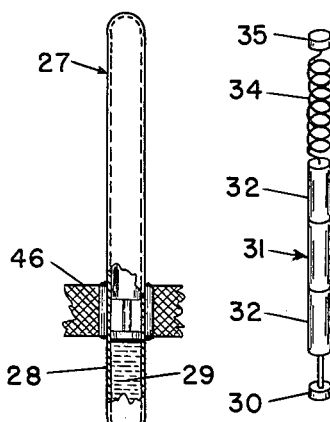
Figure 10:
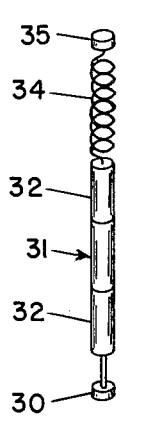
Figure 11:
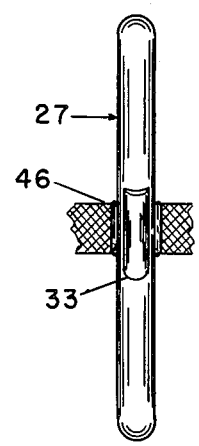
Figure 12:
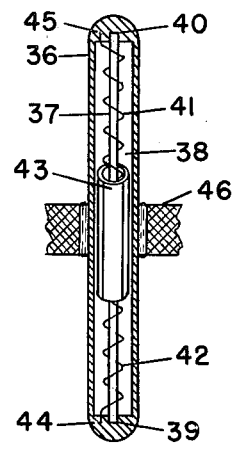

Figure 7 is the temperature-indicating tricolor disk used in the embodiment shown in Figure 6, with the broken lines indicating the position of the thermostatic element secured under the disc, Figure 8 is a conventional type baby milk bottle with a cutaway section to illustrate the position of the temperature-indicating embodiment shown in Figure 1, Figure 9 is another embodiment of my invention with a cutaway portion showing the liquid thermostatic element (with its plan view shown in Figure 11), Figure 10 is the temperature-indicating tricolor tubular element with the spring and reciprocating plug, all of which are accommodated in the embodiment shown in Figure 9, Figure 11 is the plan view of the embodiments sectionally shown in Figures 9 and 12, and, Figure 12 is the sectional view of another embodiment whose plan view is given in Figure 11, showing a tubular temperature-indicating member mounted between two thermostatic elements functioning jointly.

Referring now to the drawing, numeral 1 designates the temperature-indicating device comprising a short cylindrical base member 2 having at one end a circular plate 3 integral thereof and projecting at right angles to the periphery of the base member 2, forming a flange thereon. The circular plate 3 is provided with symmetrically positioned apertures 4, partially extending into the base member 2 and forming semicylindrical grooves on its periphery. A hollow cylindrical housing 5 of opaque material having one end in the form of a hemisphere with an apertured tip 13 and the other end open is hermetically sealed, as at 6, with a suitable binder, to the free end of the base member 2, forming a closed chamber 5a in said housing. At the lower surface of flange 3 is a gasket 7, preferably made of rubber or any other pliable composition material, which serves to seal the flange against the rim of the milk bottle and to secure said device thereon as shown in Figure 8. When the indicator is mounted over the neck of the milk bottle and the nipple with the apertured closure cap is screwed over it (Figure 8), the apertures 4 serve to permit a free flow of milk to the nipple during nursing of the baby, or to permit a free flow of blood plasma during its injection to a patient; in the latter event, the nipple is replaced by an injector with a plastic tubing.

Located in the wall of the cylindrical housing 5 of the temperature indicator is a clear window 8, the outer face of which is curved so as to permit a magnified view of the temperature-indicating member 9, which is formed of a thin cylinder of plastic, copper, aluminum or the like and having at least three successive areas colored blue, green, and red, respectively, or any other equivalent colors. The blue designates cold, green warm, and red hot, the normal temperature of the milk being limited to the green area, which covers a range of about 20 degrees Fahrenheit, in which range the milk or the plasma is in the neighborhood of human-body temperature. Any deviation from this range has to be adjusted by cooling or warming the milk or the plasma until the green area is brought into view behind the window 8.

The colored annulus 9, in order to indicate the relative temperature of the liquid in the bottle, is actuated by a thermostatic element 10 which is calibrated against a precision mercury thermometer so that the blue area will cover a range from 90° F. down to zero degree, the green will cover a range from 90 to 110° F., and the red area will extend from 110° F. to boiling temperature of water or milk. The element 10 is formed in the shape of a coil and its central end is permanently secured by welding or crimping to an axial pin 11, the upper end of which is inserted into a cavity 12 in the base member 2 and the lower end is snugly fitted in a hole in the center of the tip 13 of cylindrical housing 5 and sealed therein hermetically with cement around the lower portion of collar 14. The peripheral terminal of the thermostatic element 10 is fastened to the colored annulus 9 by means of the terminal hook 15, which is passed into the aperture 16 and secured tightly to the wall of annulus 9 by crimping or other means, so that it supports the annulus 9 in a freely rotatable position in the chamber 5a of housing 5. For instance, when the temperature of the indicator is raised, the thermostatic element 10 expands in proportion to the heat received by it, and its free end which is fastened to the annulus 9 rotates, causing the annulus 9 to rotate with it. In doing so, the different colored areas of the annulus 9 rotate with it and any colored area appearing behind the window 8 is a relative measure of the temperature. The green area behind the window, for instance, will designate normal nursing temperature of the milk. Numeral 17 is the terminal portion of the heat-conducting pin 11 and extends beyond the portion 13 of housing 5 so that heat from the milk or any liquid can be readily absorbed and conducted to the thermostatic element 10 to actuate the temperature-indicating annulus 9.

Figure 6 shows a modified embodiment of my invention in which 18 is the body member resembling the face of a wrist watch. The body member 18 can be made of opaque plastic material or metal, and has a window 19 on its surface portion through which the colored section of the temperature-indicating disc 20 can be viewed. The window 19 is made of a clear material, such as plastic or glass, and has an outer curvature so as to magnify the view of the colored disc 20. The disc 20 is actuated by the thermostatic element 21, which is similar to that marked by 10. The peripheral end of element 21 is attached to disc 20 by the curved portion 22, and the central end is secured rigidly to the pin 23, which extends through the face 24 of body member 18 and flattened so as to be rigidly fastened therein. The watch-shape body member 18 can be strapped, by strap 25, around the milk bottle shown in Figure 8. Numeral 26 is a metal ring extending from the body member 18 and supports the ends of the strap 25, which is elastic so that it can be stretched during mounting on and unmounting from the milk bottle. All parts of the embodiment are hermetically sealed so that no liquid can enter the inside of the indicator.

Another modified embodiment of my invention is shown in Figure 9, in which 27 is the body member with a cutaway section 28 where the thermo-expandable liquid can be seen. When heat is applied to liquid 29, it expands and pushes the plug 30 upward. The tubular member 31 consists of tricolor tubular sections 32 disposed consecutively (the red, green and blue, from bottom to top) and is integral with plug 30. When the plug 30 moves upward due to the expansion of the liquid, one of the sections 32 comes in view behind the window 33 (Figure 11) of the outer shell body 27, which is made of an opaque material except the window 33 which is clear plastic or glass.

A spring 34 attached between the plug 35 and the upper end of member 31 maintains a constant pressure against 31 so that the plug 30 is always in contact with the surface of the liquid 29. In this manner the member 31 moves up and down, dependent on the heat applied, and thereby indicates the temperature.

Figure 12 presents another modified embodiment of my invention. The body 36 is tubular and contains a longitudinal pin 37 which extends substantially from one end of the chamber 38 to the other and is secured in depressions 39 and 40. Around the pin 37 are two thermostatic coils 41 and 42. A tubular member 43 having three axially colored surface areas is attached to the respective ends of the coils 41 and 42. The thermostatic elements 41 and 42 are coiled in opposite directions so that when heat is applied they rotate in the same direction and thus rotate the tricolor member 43 in accordance with the degree of temperature, which is determined by viewing through window 33 of body 27 (Figure 11 is the outer plan view of both of the embodiments shown in Figures 9 and 12). The opposite ends of thermostatic elements (coils) 41 and 42 are fastened to body 36 at points 44 and 45, respectively. In use, the indicator body member 27 is attached around the milk bottle by means of the elastic strap 46.

Although a preferred embodiment of my invention is illustrated and described, it is understood that various changes may be made in the invention without departing from the spirit and scope thereof, and therefore the invention is not limited by that which is shown in the drawings and described in the specification but only as indicated in the appended claims.

What I claim is:

1. In a temperature-indicating device comprising a perforate circular base plate having a centrally-positioned opaque cylindrical closed housing, said housing forming a chamber and having a transparent window in its wall, a temperature-indicator means disposed in said housing and having variously colored areas consecutively arranged thereon, an axial pin centrally positioned within said housing and thermosensitive means integral with said pin and connected to said indicator means for supporting said indicator and for rotation thereof with reference to said pin and said window under changes of temperature therein, and a detachable annular means positioned peripherally to said base plate and adapted to secure said base plate on a baby-nursing milk bottle.

2. In a temperature-indicating device for use on a baby-nursing milk bottle the combination comprising a circular plate provided with a centrally positioned short cylindrical member, a hollow cylindrical housing having one end open and the other end hemispherical, the open end of said housing being secured to the free end of said short cylindrical member to provide a closed chamber, a magnifying window in said housing, a thermosensitive means centrally positioned within said chamber and a variously colored means connected to the periphery thereof for movement by said thermosensitive means with reference to said window under changes of temperature, said circular plate having perforations extending into said short cylindrical member and peripherally thereof for passage of milk therethrough from said bottle during nursing.

3. A temperature-indicating device for use on a baby-nursing milk bottle, comprising a circular plate having a short cylindrical member centrally formed thereon, said plate having perforations extending into said short member and forming semicylindrical grooves peripherally thereon, a recess peripherally formed at the free end of said short member and an opaque hollow housing having one end open and the opposite end hemispherical being secured to said short member at said recess to provide a chamber, said opaque housing having a transparent window in its wall, a variously colored indicator within said chamber and temperature-responsive means within the chamber and connected to said indicator for moving said indicator upon change of temperature so as to align said various colors with reference to said window for indicating conditions of temperature thereof, and means for securing said device by said base plate on the mouth of a baby-nursing milk bottle, with said perforations thereof permitting passage of contents therethrough from said bottle during nursing.

4. A temperature-indicating device, comprising a circular plate having perforations and a centrally positioned short cylindrical projection integrally formed thereon, a cylindrical housing of opaque material having a transparent window secured to the free end of said projection, said housing forming a chamber and having a hemispherical portion with an aperture centrally disposed therein, a pin centrally positioned within said chamber and extending axially from said projection to said aperture in said hemispherical portion and partially projecting therethrough to the exterior of said housing for transmitting heat from the exterior of said housing into said chamber, a thin cylinder having temperature-defining blue, green, and red colored areas thereon being disposed within the chamber and a thermosensitive means mechanically connecting said thin cylinder to said pin for movement of said thin cylinder with reference to said window under changes in temperature and for giving temperature indication, and an annular gasket secured to said circular plate for sealing said device when mounted on the mouth of a baby-nursing milk bottle, with said perforations in said plate permitting passage of milk from said bottle during nursing.

5. In a temperature-indicating device for use on a baby-nursing milk bottle, a circular plate having an integral, short, solid cylinder centrally positioned thereon, a cylindrical housing of opaque material having one end open and the opposite end hemispherically secured at the open end to said solid cylinder, a transparent window in said housing, a peripherally located colored annulus having blue, green, and red areas thereon to define temperature conditions disposed within said housing and thermosensitive means centrally positioned within said housing and connected to said annulus for movement thereof to consecutively align said colored areas with respect to said window under changes in temperature, said circular plate having means adapted to seal said device on a milk bottle when mounted thereupon and perforations therethrough to permit passage of milk from said bottle during nursing.

6. A temperature-indicating device, comprising a perforated base plate provided centrally thereof with a short cylindrical member, a housing of opaque material having one end open and the other closed and hemispherical in shape secured at its open end to said short cylindrical member to provide a chamber, a window in said opaque housing, a pin having an integral collar at one end axially positioned in said chamber and extending from the center of said short cylindrical member to an aperture disposed in the tip of the closed end of said housing and partially projecting therethrough, said collar securing said one end of said pin hermetically to the tip of said housing, a thermosensitive means within said chamber and connected to said pin, and means having colored areas thereon within said chamber positioned between said short cylindrical member and the spherical end of said housing, said last-named means being secured to said thermosensitive means and movable by said thermosensitive means upon change of temperature so as to change the position of said colored areas relative to said window, and resilient means on said plate adapted to seal said device when mounted on the mouth of a baby-nursing milk bottle.

7. In a temperature-indicating device for use on a baby-nursing milk bottle, comprising a circular base plate having perforations and a short cylindrical member centrally formed thereon, a cylindrical housing having a hemispherical end with an aperture in its center and an open end which is secured to said member to provide a chamber thereon, a window in said housing, a thermosensitive means centrally positioned in said chamber, a pin axially extending from the center of said short cylindrical member to said hemispherical end and passing to the exterior through said aperture therein, said thermosensitive means having an annulus with colored temperature-defining areas thereon and being rotative by said thermosensitive means being connected to said pin with reference to said window under changes of temperature in said chamber.

8. A temperature-indicating device comprising a perforated circular plate provided centrally thereof with a short cylindrical housing having a chamber therein, an annulus having a plurality of consecutively colored areas thereon being disposed within said chamber and a thermosensitive spiral within said chamber connected at one end to said annulus and at the other end to an axial pin centrally positioned in said chamber, a convex window in the wall of said housing and said annulus being rotative with reference to said window by means of said thermosensitive means upon change of temperature therein for consecutively aligning said colored areas with respect to said window to indicate the temperature condition thereof, a resilient gasket affixed to the underside of said base plate for sealing said temperature-indicating device when mounted on the mouth of a baby-nursing milk bottle, said base plate being provided with perforations extending adjacent to said housing for passage of milk from said baby-nursing bottle to a nursing nipple when placed substantially over the side opposite to the gasketed surface of said plate, an apertured closure cap inserted over said nipple and said base plate, with said nipple protruding through said aperture, said closure cap adapted to be secured to said bottle.

9. A temperature-indicating device comprising a circular base plate provided centrally thereof with a cylindrical housing of opaque material having a chamber, a peripheral indicating means having blue, green, and red colored areas thereon being disposed in said chamber, thermosensitive means centrally disposed in said chamber and connected to said indicating means, a transparent window in said housing for consecutively viewing the colored areas on said indicating means rotatable by said thermosensitive means with reference to said window under changes in temperature therein, a resilient gasket affixed to one side of said base plate for sealing said device when mounted on the mouth of a baby-nursing milk bottle, said base plate being provided with perforations for passage of milk from said baby-nursing bottle to a nipple positioned on the side opposite to the gasketed surface of said base plate, and annular means removably positioned on the periphery of said base plate and adapted to secure said nipple and said device to said baby-nursing bottle.

References Cited in the file of this patent

UNITED STATES PATENTS

| 197,156 | Meyer | Nov. 13, 1877 |
| 1,403,228 | Brach | Jan. 10, 1922 |
| 1,553,743 | Bluebauch | Sept. 15, 1925 |
| 2,483,979 | Morrill | Oct. 4, 1949 |
| 2,648,226 | Finch | Aug. 11, 1953 |
| 2,674,882 | Doggett | Apr. 13, 1954 |

FOREIGN PATENTS

| 766,323 | France | Apr. 9, 1934 |